L. S. KNIGHT.
FILTER FILM OR BED AND PROCESS OF MAKING THE SAME.
APPLICATION FILED JUNE 27, 1917. RENEWED MAY 7, 1918.
1,285,233.
Patented Nov. 19, 1918.
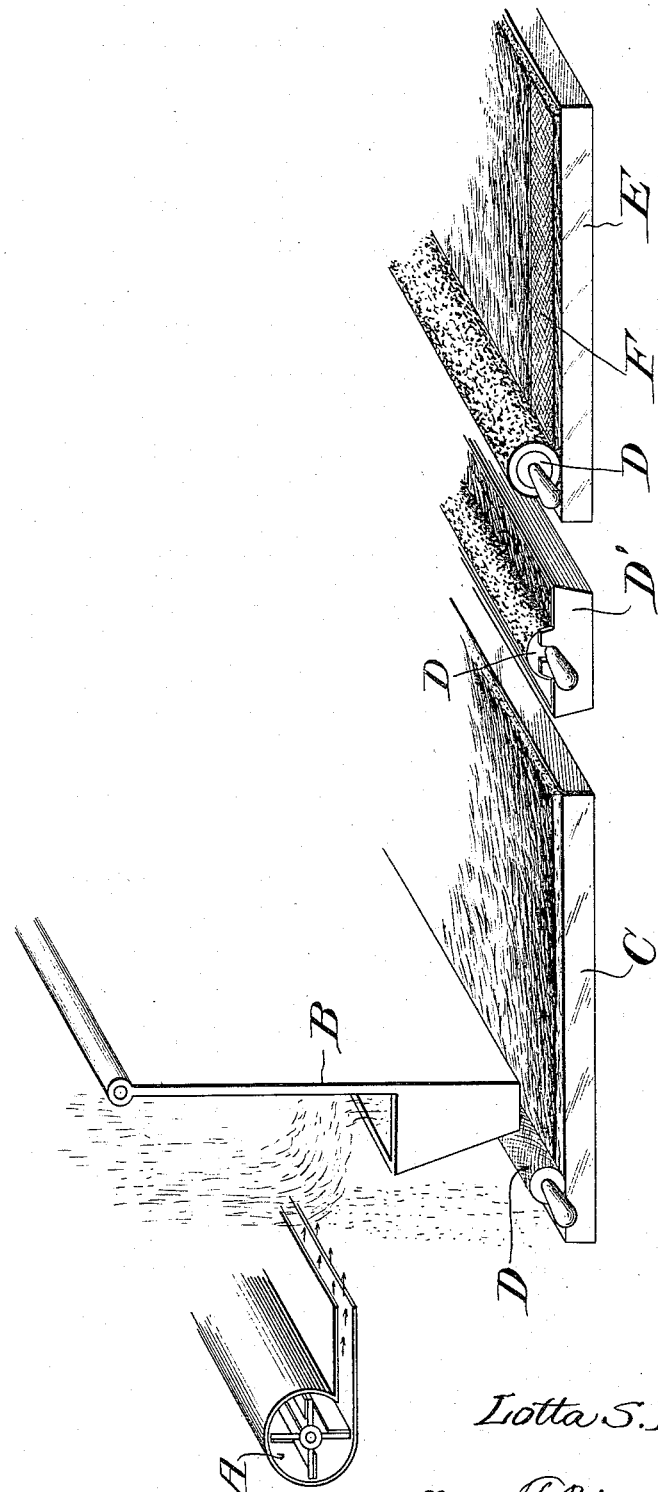
Inventor
Lotta S. Knight
By T. Walter Fowler
Attorney

UNITED STATES PATENT OFFICE.

LOTTA S. KNIGHT, OF NEW YORK, N. Y.

FILTER FILM OR BED AND PROCESS OF MAKING THE SAME.

1,285,233.   Specification of Letters Patent.   Patented Nov. 19, 1918.

Application filed June 27, 1917, Serial No. 177,396. Renewed May 7, 1918. Serial No. 233,183.

*To all whom it may concern:*

Be it known that I, LOTTA S. KNIGHT, a citizen of the United States, residing at Staten Island, N. Y., 2034 Madison Ave., New York city, N. Y., have invented certain new and useful Improvements in Filter Films or Beds and Processes of Making the Same, of which the following is a specification.

My invention relates to certain new and useful improvements in tubular filter films or beds and the process of making the same, and the invention consists of the improved film or bed and the steps by which the process is carried out, as I will hereinafter fully describe and claim.

A leading object of the invention is to provide a tubular film or filter bed of a cheap and efficient character, and one which is seamless and may or may not be carbonized, and which may be removed and replaced with the expenditure of little time and energy.

A further object of the invention is to construct a tubular film or filter bed of the character hereinbefore described, and wherein the various steps for making the film may be performed without handling of the asbestos or other fibrous material of which the film is composed, thereby making the film under the most sanitary conditions and where the danger of contamination is reduced to a minimum, a condition which is very essential in the filtration of water for drinking purposes.

In the accompanying drawing I have illustrated diagrammatically an apparatus illustrating the several steps of making the film, but it will be understood that I do not limit myself to this apparatus or to any particular type of apparatus, as it is quite evident that the various modes of procedure which I will hereinafter mention, may be performed partly by hand and partly by mechanical means, and that various types of apparatus may enter into the operations without departing from the salient features of the invention.

It has long been recognized that filter beds, composed of asbestos fibers are well adapted for the filtration of fluids, in that they provide for a rapid filtration and for an effectual separation of the solids and the filtrate in matter containing impurities in suspension. For these and other reasons I prefer to use asbestos in the making of my improved tubular film or filter bed, and in carrying out the invention, I first take carded asbestos fibers and subject these to a more or less high temperature and to a temperature sufficient to effect the destruction of any contained germs or evidence of animal life. These fibers in their loose and flocculent condition are caused, by hand or otherwise, to fall into the path of a blast delivered from a blower A, or other device. The purpose of this is to open up fibers and allow any grit or foreign matter which they might contain, to separate by gravity from the lighter fibers, which latter are, by the blast, diverted and blown against a curtain or shield B, or equivalent device, and which in practice may have a conical delivery end through which the fibers may be discharged. Below the delivery end of this curtain or shield, I arrange a tabular surface C, preferably in the form of a slab of glass, porcelain or the like, as the fibers do not stick to such a surface, and a relative horizontal movement is imparted to this slab or bed, and the curtain or receiver B, so that the fibers delivered from the matter are more or less evenly distributed over the surface of the bed, an operation which is effected without the hands coming in contact with the fibers.

I next take a roller D, the diameter and length of which may approximate the diameter and length of the tubular film to be formed, this roller having handles of some character at the ends by which it may be manipulated, and rolled over the mass of fibers which have been distributed upon the bed or slab C, before mentioned. Before rolling these fibers, however, I place a covering of fibrous material over the roller, and which covering may be made of cheese cloth or the like, and which has been first treated to eliminate any contained bacteria, the covering being subjected to a slight stretching, or being under some slight tension, so that it will hold in place on the roller. The known tendency of the flocculent fibers of asbestos to adhere to a fibrous material, and the fact that the cloth above mentioned is of a coarsely woven character, enables the asbestos to enter the pores of the cloth and to readily attach themselves to the cloth so that in operating the roller over the mass of loose fibers on the bed or slab, the fibers are progressively wound upon the roller as the latter is pushed along the slab; at the same time the fibers are subjected to some pressure due to this rolling action, and there results a tubular and seamless layer. The roller with its attached cylinder of fibrous material may now be rolled upon another layer of carded asbestos, supplied substantially in the manner before described, but for many reasons I prefer that after having wound the one layer upon the roller that this layer shall be treated to a coating of carbon, as charcoal, to increase the purifying properties of the completed film or bed. Accordingly, the roller with its attached cylinder of asbestos fibers may now be placed in a tank D containing the carbonaceous material, and rotated therein so that the surface of the fibrous cylinder will take up a thin layer of said material. This having been done, the roller with its coated fibrous cylinder is now placed upon a bed or slab E, of glass or otherwise, and upon the fibers of which, along one edge, a strip of gauze F or like material, is placed, and the roller with its coated fibrous cylinder is now rolled over the mass of fibers distributed on the second named bed to form a second layer, which is also seamless, and which fully conceals and incloses a carbon coating of the first layer and likewise conceals the strip of gauze E, which was placed along the edge of the fibers of the second table and which strip serves as a reinforce for the base of the finished film or filter tube.

If a film of still greater thickness is desired, the operation may be repeated by the winding of a third or additional layers in the manner before described. The tubular film if now removed by slipping the same endwise from the roller, and it is then dried by either natural or artificial heat. I have found that if dry steam is used for this heating it seems to have the property of giving hardness to the body of the film.

A tubular film or filter bed, constructed as above described, may be used for the filtration of water, saccharine solutions, chemicals or other liquids containing matters in suspension, and it is quite apparent that the films may be given any desired diameter and may have any desired length, thereby adapting such a film to many uses, and with vastly different types of apparatus, it being only essential that such a film as I have described shall be used in connection with a perforate form or cylinder, of metal or otherwise, and over which the fibrous tubular film or bed which I have herein described is placed and secured in any manner for filtering purposes.

Having thus described my invention, what I claim as new and desire to secure by Letters Patent is:—

1. The method herein described of making a tubular film or bed for a filter, which method consists, essentially, in distributing flocculent fibrous material upon a suitable bed and then rolling the fibers on a form into a seamless tube upon said bed.

2. The method herein described of making a tubular film or bed for a filter, which method consists, essentially in distributing flocculent asbestos fibers upon a suitable surface, and then rolling over said surface a cylinder having a removable woven fabric covering to which the fibers readily attach whereby a tubular and seamless fibrous form is produced.

3. The method herein described of making a tubular film or bed for a filter, which method consists, essentially, in distributing flocculent asbestos fibers upon a suitable surface, and then rolling over said surface a cylinder having a removable woven fabric covering to which the fibers readily attach whereby a tubular and seamless fibrous form is produced, then coating said tubular form with a purifying agent, and then rolling the coated tubular form over another mass of distributed flocculent fibers to form a second winding thereon, and finally removing and drying the completed tubular film or bed.

4. The method herein described of making a tubular film or bed for a filter, which method consists, essentially, in distributing flocculent asbestos upon a suitable surface, and then rolling over said surface a cylinder having a removable woven fabric covering to which the fibers readily attach whereby a tubular and seamless fibrous form is produced, then applying an exterior coating of carbonaceous material to said tubular form, then rolling the coated tubular form over a second mass of distributed flocculent fibers along one portion of which a reinforcing fibrous sheet has been placed, whereby a second winding and internal reinforce are produced in the tubular form; and then removing and drying the tubular form.

In testimony whereof I affix my signature.

LOTTA S. KNIGHT.